United States Patent
Lachwani et al.

(10) Patent No.: US 8,200,864 B1
(45) Date of Patent: Jun. 12, 2012

(54) PRE-DEFINED MULTIBLOCK TRANSFERS

(75) Inventors: Manish Lachwani, Sunnyvale, CA (US); David Berbessou, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 32 days.

(21) Appl. No.: 12/716,042

(22) Filed: Mar. 2, 2010

(51) Int. Cl.
*G06F 13/12* (2006.01)

(52) U.S. Cl. .............. 710/65; 710/30; 710/35; 710/100; 710/105; 710/106; 710/301; 710/305; 710/306; 711/100; 711/115; 711/167

(58) Field of Classification Search .......................... None
See application file for complete search history.

(56) References Cited

U.S. PATENT DOCUMENTS

| | | | | |
|---|---|---|---|---|
| 6,983,366 | B1 * | 1/2006 | Huynh et al. .................. | 713/168 |
| 7,177,975 | B2 * | 2/2007 | Toombs et al. ................ | 711/103 |
| 7,565,469 | B2 * | 7/2009 | Mylly et al. .................. | 710/105 |
| 7,831,755 | B2 * | 11/2010 | Yun et al. ..................... | 710/301 |
| 2001/0016887 | A1 * | 8/2001 | Toombs et al. ................ | 710/102 |
| 2004/0252841 | A1 * | 12/2004 | Henry et al. .................. | 380/277 |
| 2005/0185463 | A1 * | 8/2005 | Kanamori et al. ........ | 365/185.04 |
| 2005/0210164 | A1 * | 9/2005 | Weber et al. ..................... | 710/35 |
| 2006/0103948 | A1 * | 5/2006 | Mylly et al. .................. | 359/689 |
| 2006/0282634 | A1 * | 12/2006 | Ohtsuka ........................ | 711/167 |
| 2007/0299996 | A1 * | 12/2007 | Guy et al. ........................ | 710/63 |
| 2008/0209092 | A1 * | 8/2008 | Yun et al. ..................... | 710/106 |
| 2010/0257308 | A1 * | 10/2010 | Hsu et al. ..................... | 711/103 |
| 2011/0283027 | A1 * | 11/2011 | Buesching et al. ........... | 710/105 |

OTHER PUBLICATIONS

'MultiMediaCard (MMC) Electrical Standard, High Capacity' by JEDEC Solid State Technology Association, Jul. 2007.*
'Embedded MultiMediaCard (eMMC) Mechanical Standard' by JEDEC Solid State Technology Association, Jun. 2007.*

* cited by examiner

*Primary Examiner* — Steven Snyder
(74) *Attorney, Agent, or Firm* — Lee & Hayes, PLLC

(57) ABSTRACT

Transfer of data blocks between a host and a multi-media card ("MMC") are performed in a pre-defined mode. In pre-defined mode, the host sets a pre-determined number of blocks, a "multiblock," to be transferred. Use of pre-defined mode results in faster transfers than those performed using an open-ended mode incorporating a stop command. Furthermore, corruption errors resulting from delays in providing the stop command which may occur in an open-ended mode are avoided. Pre-defined multiblock transfers are supported by existing operating systems through trapping open-ended mode transfers in the MMC stack, leaving existing device drivers unaffected.

20 Claims, 5 Drawing Sheets

PRE-DEFINED MULTIBLOCK TRANSFERS

BACKGROUND

Electronic devices such as electronic book (eBook) reader devices, cellular telephones, portable media players, desktop computers, laptops, tablet computers, netbooks, personal digital assistants, and the like, may use multimedia cards ("MMCs") to store data.

A MMC comprises a memory device capable of storing information and retaining the information once power has been removed. MMC's include those defined by the e-MMC and miCARD specifications maintained by the JEDEC Solid State Technology Association of Arlington, Va. An electronic device may have a MMC host controller which communicates with the MMC to store and retrieve information.

Traditionally, the transfers of sections of data, or "blocks," between a MMC host controller and MMC have been accomplished via an "open-ended" mode of transfer. In the open-ended mode of transfer, the MMC host controller sends a read/write command for blocks. Once the last block has been transferred, a processor may send a stop command to the MMC host controller within a specified window of time, which then stops further data transfers.

However, a processor may be engaged with other tasks and may not generate the stop command within the window of time. Failure of the MMC host controller to receive the stop command within that window of time results in a corrupt transfer. A corrupt transfer may produce a variety of adverse effects. One adverse effect is a retry of the multiblock transfer, which delays information storage and retrieval and reduces overall throughput of data. Delays may also result in resource starvation, which occurs when a requesting device cannot access the data the device needs for uninterrupted operation.

Thus, electronic devices would benefit from a more reliable and faster system to transfer data between a MMC host controller and a MMC, without disrupting existing device drivers and other operating system infrastructure.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
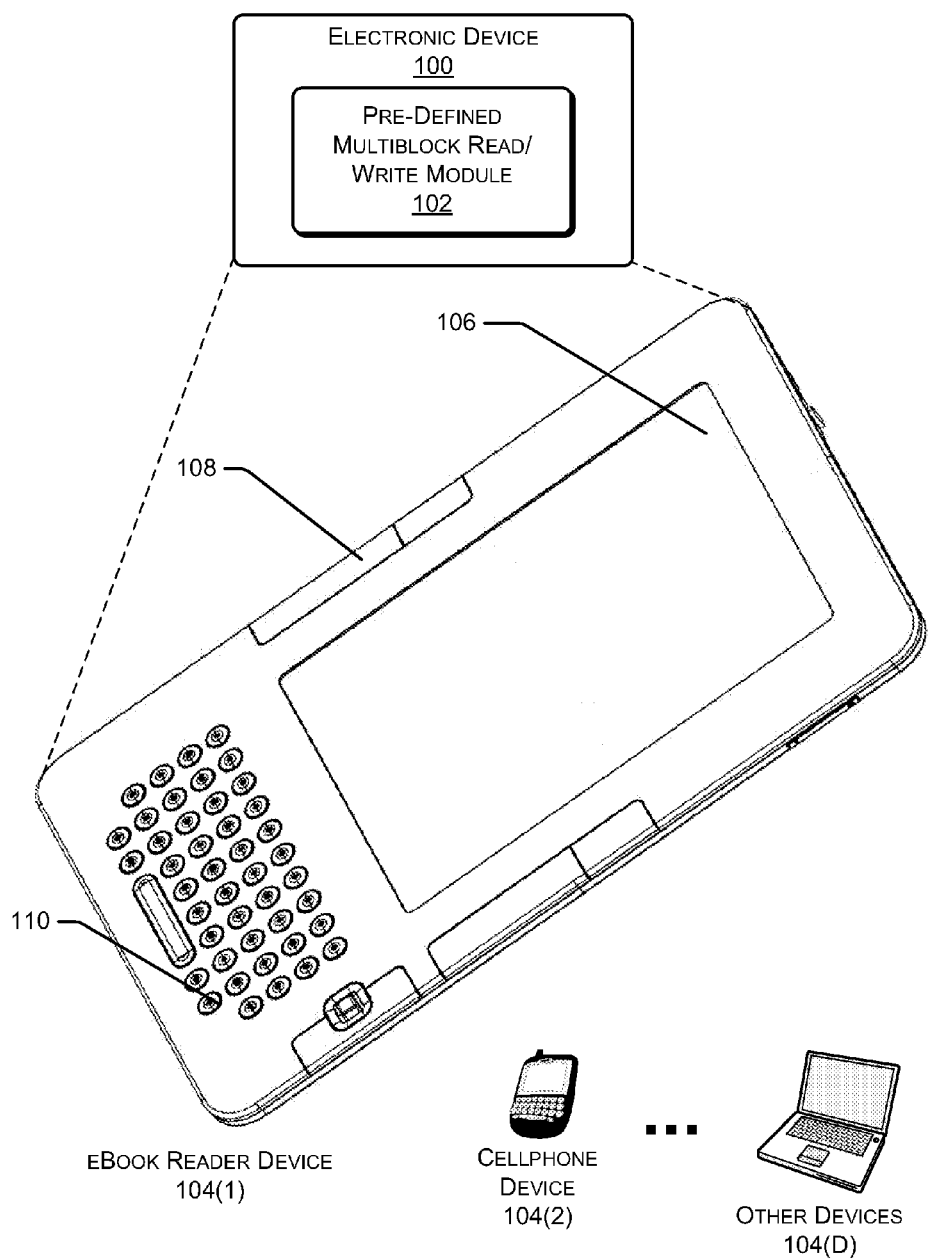
FIG. 1 is an illustrative electronic book (eBook) reader device configured with a pre-defined multiblock read/write module which transfers multiblocks using a pre-defined mode of transfer.

As described above, an open-ended mode of transfer between a multimedia card (MMC) host controller and a multimedia card suffers drawbacks stemming from the reliance on the receiving of a stop command within a specified window of time to indicate that the transfer is complete. These drawbacks include transfer delays, resource starvation, and overall reductions in transfer bandwidth due to errors. Transfer delays, resource starvation, and reduced transfer bandwidth may adversely impact users of electronic devices. Thus, a user may experience delays or failure in trying to access content stored on the multimedia card. For example, a user of an eBook reader device may be unable to access an eBook due to failure of the open-ended mode of transfer.

In some MMC architectures, this specified window of time to send the stop command is fixed. For example, in architectures promulgated by Samsung Electronics, the window of time from the transfer of a last data block to the issuing of the stop transmission command is about 12 microseconds. When an operating system is maintaining several processes and kernel threads and receiving various interrupts at any moment, it becomes likely that the stop command will not be issued within that window of time. Failure to issue the stop command generates an error and results in the drawbacks mentioned above.

A pre-defined mode of transfer alleviates these drawbacks by setting a specific number of blocks for transfer and removing the requirement for transmission of the stop command. Depending upon system architecture, the size of a block may vary. By way of example, and not as a limitation, a block may comprise a sector of 512 bytes. A multiblock may comprise a set of multiple blocks.

As described below, a pre-defined mode of transfer may be implemented with minimal changes to an existing system by trapping an open-ended mode of transfer command sent to a MMC stack. Once trapped, a command is sent to the MMC host controller indicating a pre-defined count of blocks to transfer. A stop transmission flag typically associated with an open-ended mode of transfer may also be updated in the MMC stack. Thus, the transfer occurs in a pre-defined mode while satisfying the expected open-ended mode of transfer requirements in the MMC stack. This reduces disruption and development costs associated with changes to device drivers, operating systems, and other components of a MMC stack.

The methods and systems herein may be implemented by an electronic device utilizing a MMC host controller. For example, the i.MX architecture from Freescale Semiconductor Incorporated, of Austin, Tex., United States of America, is one suitable family of processors with a MMC host controller.

The architecture also includes a processor configured to execute an operating system, including, but not limited to, Linux®, UNIX®, Microsoft Corporation's Microsoft Windows®, Microsoft Corporation's Windows Mobile®, Apple Corporation's Mac OS®, Apple Corporation's Mac OS X®, and Wind River Systems Inc.'s VxWorks®.

For example, an eBook reader device may incorporate a Freescale™ processor having an i.MX architecture and executing a Linux® kernel. The kernel uses device drivers to communicate with peripheral devices such as external memory interfaces (EMIs), Universal Serial Bus (USB) controllers, MMC host controllers, and so forth. These peripheral devices may reside on the same "chip" or die as the processor as in the case of the i.MX architecture, be on another die, or a combination of the two.

While this overview is described in terms of an eBook reader device, the concepts described herein may also be applicable to cellular telephones, portable media players, desktop computers, laptops, tablet computers, netbooks, personal digital assistants, or any other electronic devices.

Illustrative eBook Reader Device

FIG. 1 is an illustrative electronic device 100 configured to implement a pre-defined multiblock read/write module. Several electronic devices are shown in this illustration, each of which may utilize the pre-defined multiblock read/write module 102. For example, an eBook reader device 104(1) is shown embodied as a handheld, dedicated eBook reader device. FIG. 1 also illustrates that a cellphone device 104(2) and any other electronic devices 104(D) (such as a netbook computer) may implement the pre-defined multiblock read/write module 102. As used in this application, letters within parenthesis such as "(D)" indicate an integer number greater than zero.

The eBook reader device 104(1) may have a display 106 to present content in a human-readable format to a user. The display 106 may be an electrophoretic display, cholesteric display, liquid crystal display, light emitting diode display, and so forth. In some implementations, one or more displays 106 may be present. These displays may be of the same or different types. For example, one display may be an electrophoretic display while another may be a liquid crystal display.

The content presented on the display 106 may take the form of electronic books or "eBooks." For example, the display 106 may depict the text of the eBooks and also any illustrations, tables, or graphic elements that might be contained in the eBooks. The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The display 106 may further include touch screen capabilities that allow user input through contact or gesturing relative to the display. For convenience only, the display 106 is shown in a generally rectangular configuration. However, it is understood that the display 106 may be implemented in any shape, and may have any ratio of height to width. Also, for stylistic or design purposes, the display 106 may be curved or otherwise non-linearly shaped. Furthermore, display 106 may be flexible and configured to fold or roll in some implementations.

The eBook reader device 104(1) may also incorporate a keypad that includes one or more actuable controls 108 and a keyboard 110 for user input. The one or more actuatable controls 108 may have dedicated or assigned operations. For instance, the actuatable controls 108 may include page turning buttons, a joystick, navigational keys, a power on/off button, selection keys, joystick, touchpad, and so on. Furthermore, the keypad may include any other controls configured to receive any other sort of user input via buttons, touch screen inputs, or the like.

While one embodiment of electronic device 100 is shown in relation to an eBook reader device 104(1), it is understood that the electronic device 100 may include cellular telephones 104(2), and other devices 104(D) such as portable media players, desktop computers, laptops, tablet computers, netbooks, personal digital assistants, servers, medical devices, and the like.

Figure 2:
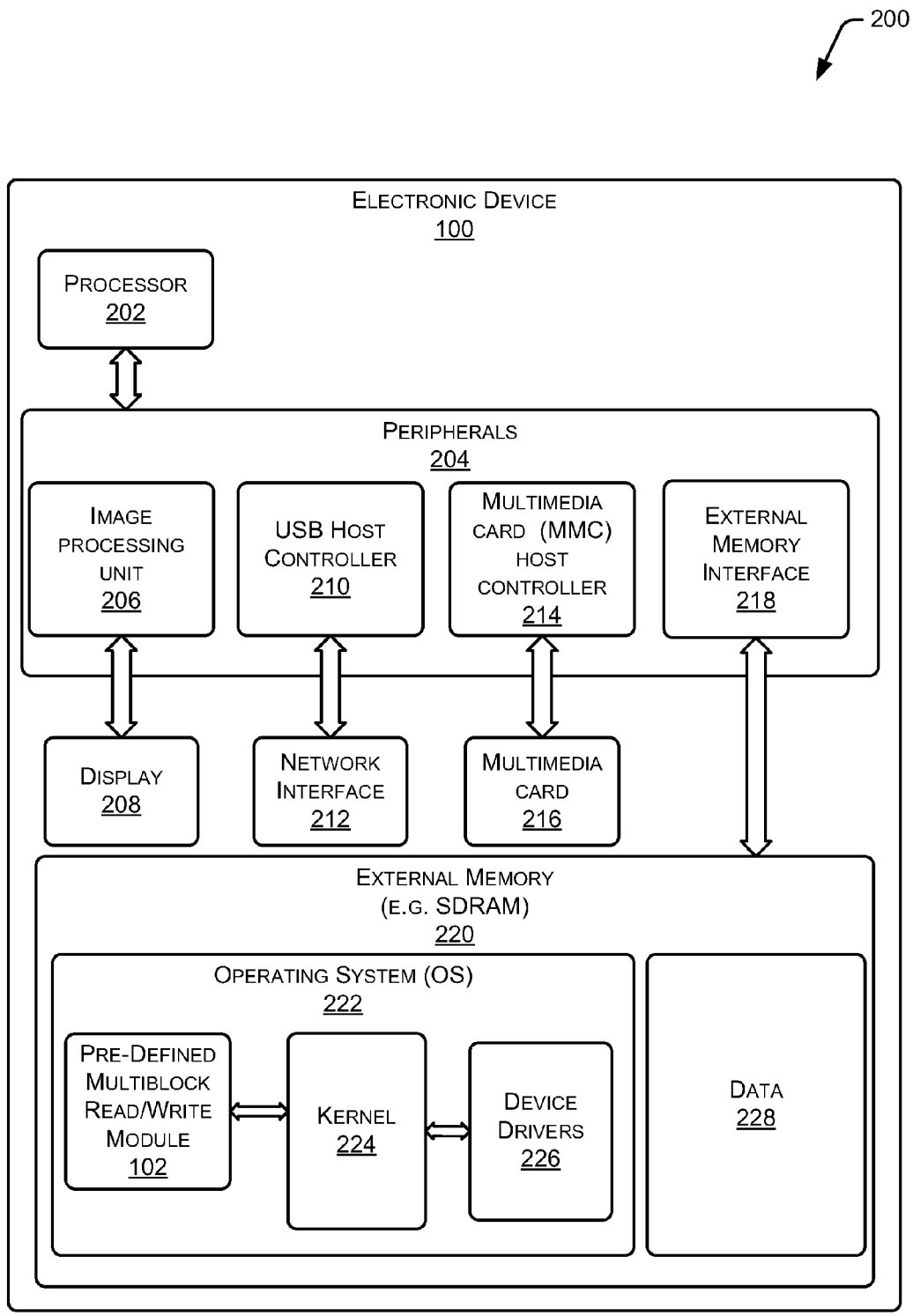
FIG. 2 is an illustrative schematic of the electronic device of FIG. 1 that includes the pre-defined multiblock read/write module.

FIG. 2 illustrates selected functional components 200 that might be implemented in the electronic device 100. In a very basic configuration, the device 100 includes components such as one or more processors 202. Each processor 202 may itself comprise one or more processors. In some implementations there may be a plurality of processors 202.

One or more peripherals 204 may couple to the processor 202. For instance, FIG. 2 illustrates an image processing unit 206 coupled to one or more displays 208. For example, this display 208 may be display 106 on eBook reader device 104(1) described above. In some implementations, multiple displays may be present and coupled to the image processing unit 206. In some implementations, one or more image processing units 206 may couple to the multiple displays.

The electronic device 100 may have a keyboard, which may be the same, for example, as the keyboard 110 on eBook reader device 104(1) described above having user actuable controls 108. A hard drive which may use magnetic or optical memory on spinning disks or solid state storage may be present to store information, such as eBooks.

FIG. 2 further illustrates that electronic device 100 may include a USB host controller 210. The USB host controller 210 manages communications between devices attached to a universal serial bus ("USB") and the processor 202 and other peripherals. The USB host controller 210 may be coupled to a network interface 212 via the universal serial bus. Network interface 212 may allow for connection to wired or wireless local or wide area networks.

The electronic device 100 also includes a multimedia card ("MMC") host controller 214. The MMC host controller 214 is configured to transfer data to and from a multimedia card 216. This data may in turn be transferred from MMC host controller 214 to the processor 202 or other peripherals 204. In some implementations, the MMC host controller 214 may operate as defined by the e-MMC and miCARD specifications maintained by the JEDEC Solid State Technology Association of Arlington, Va.

An External Memory Interface ("EMI") 218 is also shown coupled to external memory 220. Processor 202 and other peripherals 204 may access the external memory 220 via the EMI 218 which manages access to external memory 220 and data stored therein. External memory 220 may comprise Static Random Access Memory ("SRAM"), Pseudostatic Random Access Memory ("PSRAM"), Synchronous Dynamic Random Access Memory ("SDRAM"), Double Data Rate SDRAM ("DDR"), or other computer readable storage media.

The external memory 220 may be used to store any number of functional components that are executable on the processor 202, as well as data including content items, such as eBooks. Thus, the external memory 220 may store an operating system 222 comprising a kernel 224 operatively coupled to one or more device drivers 226. The device drivers 226 are also operatively coupled to the peripherals 204. The kernel 224 may also be coupled to the pre-defined multiblock read/write module 102, as introduced with reference to FIG. 1. In some implementations, the pre-defined multiblock read/write module 102 may be internal to the kernel 224.

As illustrated, the external memory 220 may also store data 228. This data may comprise content objects for consumption on the electronic device, executable programs, databases, user settings, configuration files, and so forth. In some implementations, the kernel 224, the device drivers 226, the pre-defined multiblock read/write module 102, or a combination thereof may be stored in the memory of the multimedia card 216.

Other peripheral devices may be present in the electronic device 100. These other devices may include a Firewire bus, camera, global positioning system, Bluetooth™ wireless interface, PC Card component, and so forth.

Couplings, such as that between the kernel 224 and the device drivers 226, are shown for emphasis. There are couplings between many of the components illustrated in FIG. 2, but graphical arrows are omitted for clarity of illustration.

Figure 3:
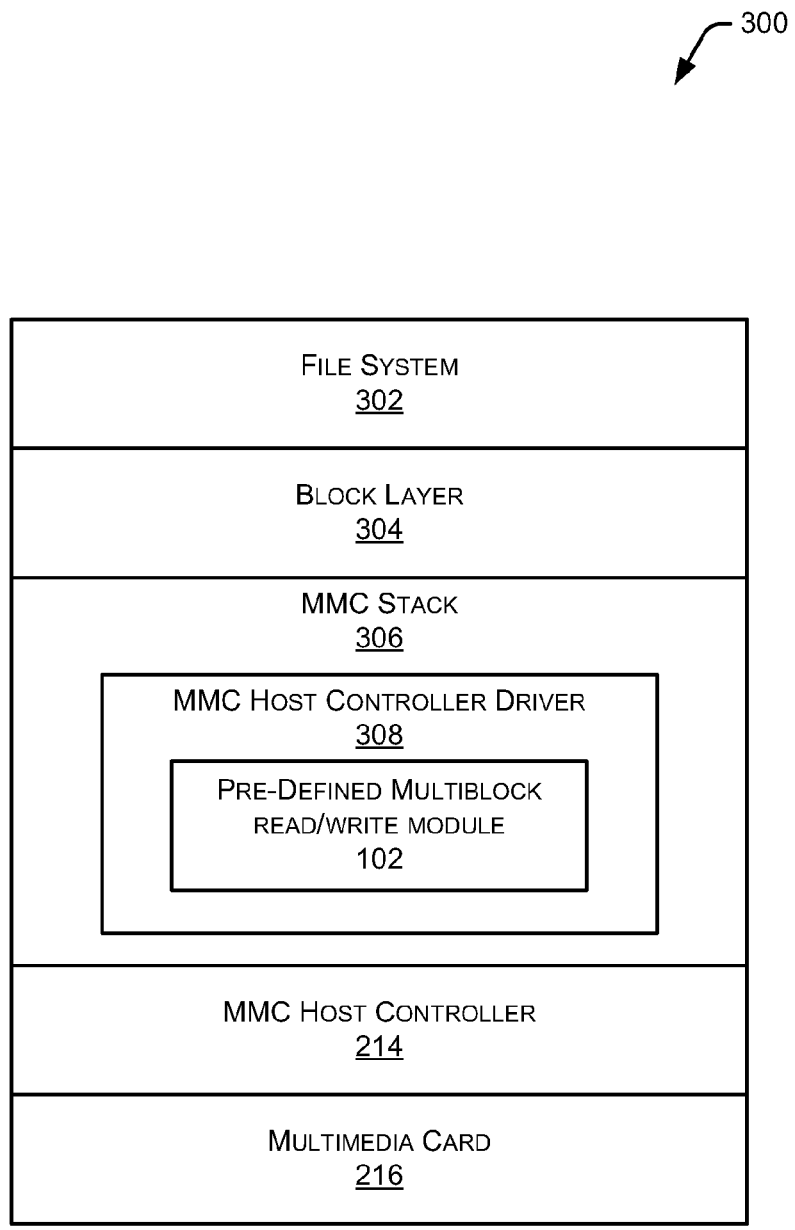
FIG. 3 is an illustrative architecture of a file system stack incorporating a MMC stack with a pre-defined multiblock read/write module.

FIG. 3 is an illustrative architecture of a file system stack 300 which may include a MMC stack. FIG. 3 first illustrates a file system 302, which provides an abstraction layer to the operating system 222 for maintaining data in groupings known as files. The file system 302 is responsible for storage and retrieval of data to and from underlying data storage devices, including to and from a multimedia card 216. The file system 302 interacts with a block layer 304. Files may actually comprise one or more discrete portions of data, or blocks. In some but not all implementations, a block may comprise 512 bytes of data. Block layer 304 thus handles the movement of blocks between the file system 302 and underlying storage devices, such as hard disk drives, MMCs, and so forth.

A MMC stack 306 acts as an interface between the block layer 304 and the MMC host controller 214. The MMC stack 306 is responsible for converting requests and commands made at the block layer 304 into commands that are suitable for the MMC device drivers and hardware.

The MMC stack 306 may include a MMC host controller driver 308 that accepts commands from the block layer 304 and places them into the appropriate format for action by the MMC host controller 214 hardware. As shown, the MMC host controller driver 308 includes at least a portion of the pre-defined multiblock read/write module 102 that is configured with a trap. This trap accepts requests for the open-ended mode of transfer and provides open-ended mode of transfer-appropriate responses while actually initiating a pre-defined mode of transfer.

For example, a CMD23 command is sent to the MMC host controller 214 to set a block count for pre-defined transfer. Additionally, a stop transmission flag such as the MMC_STOP_TRANSMISSION may be set to null, indicating the transfer is complete. Thus, a pre-defined mode of transfer takes place, while the higher levels in the file system stack 300 continue to see the transfer as a traditional open-ended block transfer.

The MMC host controller driver 308, as modified by the pre-defined multiblock read/write module 102, communicates in turn with the MMC host controller 214 hardware. The MMC host controller 214 handles physical connectivity and electrical signaling with the multimedia card 216 for transmitting and receiving data to and from the multimedia card 216.

Illustrative Process for Pre-Defined Multiblock Read/Write

Figure 4:
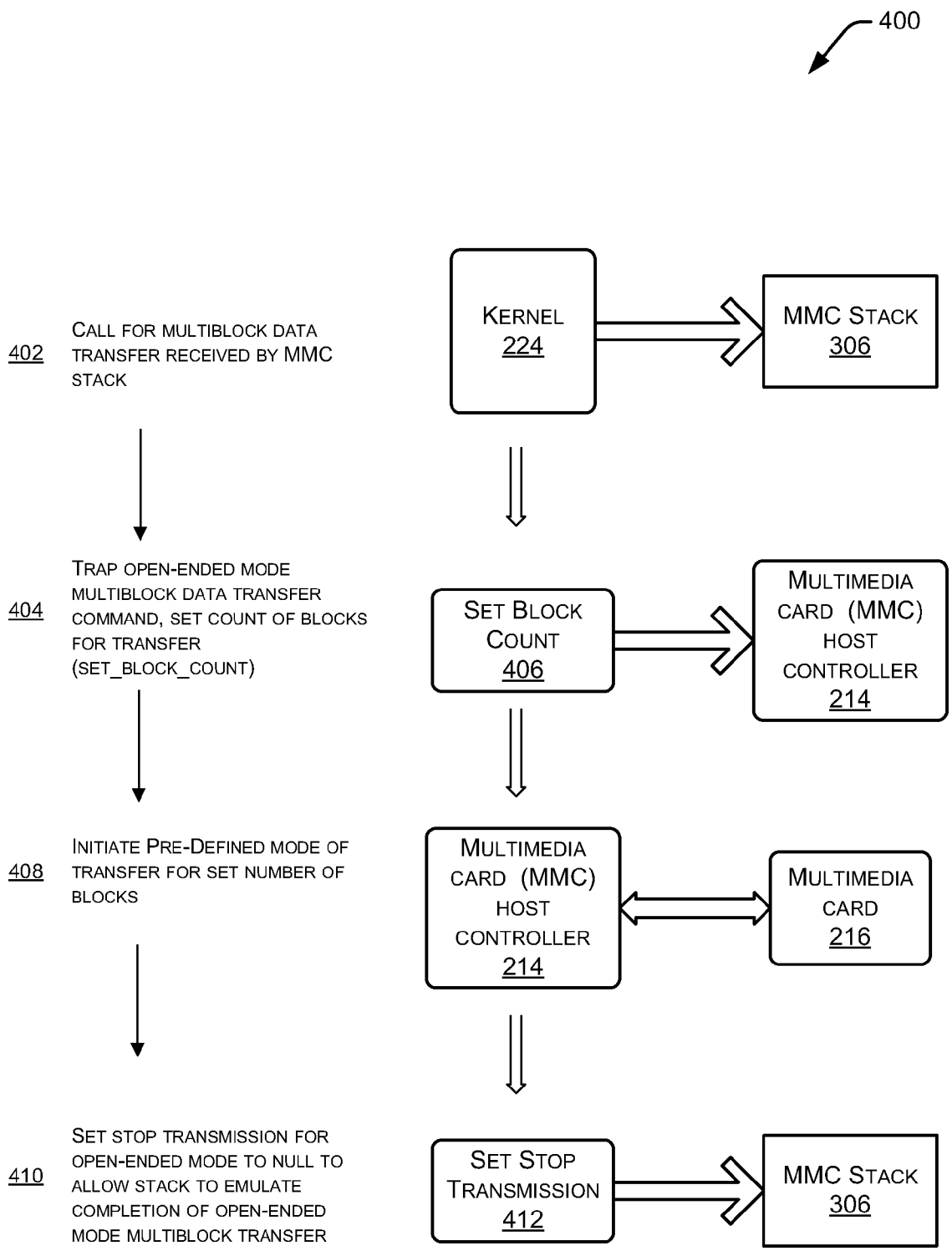
FIG. 4 is an illustrative process of using a pre-defined multiblock read/write module to trap open-ended mode of transfer requests and transfer data using a pre-defined mode.

FIG. 4 is an illustrative process 400 of using a pre-defined multiblock read/write module, such as the module 102 described above. As described above, the open-ended mode of transfer is trapped and pre-defined mode of transfer commands are inserted into an execution sequence in the MMC stack 306.

At 402, a request for a multiblock data transfer involving a multimedia card 216 is received by the MMC stack 306 from the kernel 224. For example, electronic device 100 may retrieve an eBook stored on a multimedia card 216. This call for a multiblock data transfer from the kernel 224 is ultimately trapped in the MMC stack 306 by the pre-defined multiblock read/write module 102. Once trapped, the pre-defined multiblock read/write module 102 may prepare for a pre-defined mode of transfer.

At 404, the pre-defined multiblock read/write module 102 traps the open-ended mode multiblock data transfer request and issues a set block count 406 command to the MMC host controller 214. A trap occurs when a program call or function is intercepted. Depending upon the architecture, the interception may include a suspension, redirection, or modification to the program call or function. In some implementations, the set block count 406 command may comprise CMD23, which may also be known as SET_BLOCK_COUNT. This command sets the pre-defined count of blocks for transfer by the MMC host controller 214. The transfer of data may then begin.

After the pre-defined count of blocks is transferred, the transfer completes normally without waiting for a stop transmission command, as is required in an open-ended transfer. Removal of the requirement for issuing the stop transmission command within a specified window of time thus removes the potentiality for missing the window and corrupting the transfer. As a result, the drawbacks described earlier, such as retries, delays, and resource starvation, are avoided.

At 408, a pre-defined mode of transfer for the set count of blocks is initiated. The transfer occurs between the MMC host controller 214 and the multimedia card 216. Once the set count of blocks has been transferred, the transfer stops without need for a stop transmission command, as required by an open-ended transfer. Thus, data corruption or delay due to a stop transmission command issued after the window of time has passed does not occur because no stop transmission command is necessary.

At 410, the pre-defined multiblock read/write module 102 may set a stop transmission flag 412 in the MMC stack 306 to null. The null value in the stop transmission flag normally indicates the open-ended transfer has completed, and the stop command was received within the required window of time. This action of setting the stop transmission flag to null emulates the normal completion expected by participants in the file system stack 300 for an open-ended mode of transfer. This emulation of a normally-complete, open-ended mode of transfer minimizes changes necessary to the MMC stack 306, thus simplifying implementation.

Figure 5:
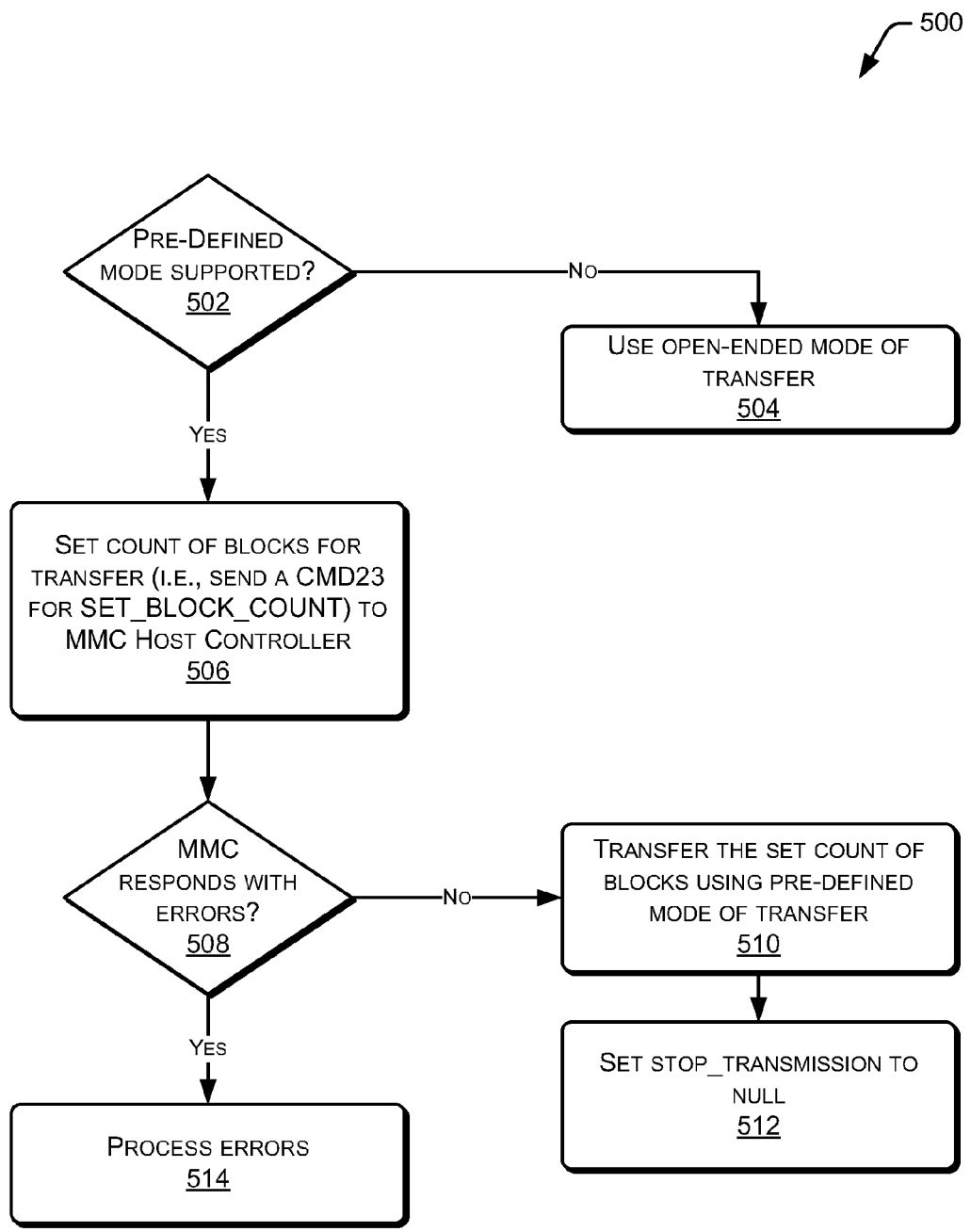
FIG. 5 is an illustrative flow diagram of a process for utilizing a pre-defined multiblock read/write module to trap open-ended mode requests and transfer multiblocks via a pre-defined mode.

FIG. 5 illustrates an example process 500 of utilizing a pre-defined multiblock read/write module that may be implemented by the architecture of FIGS. 1-3 or by other architectures. These processes are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

Upon receiving a multiblock transfer request, block 502 determines when a pre-defined mode of transfer is supported by the MMC host controller 214. This determination may be made by a MMC host controller driver 308 interrogating the MMC host controller 214. When the pre-defined mode is not supported by the MMC host controller 214, block 504 may use an open-ended mode of transfer.

When block 502 determines the pre-defined mode is supported by the MMC host controller 214, block 506 prepares for the pre-determined transfer. Block 506 sets a pre-defined count of blocks to transfer. This may be completed by sending a CMD23, also known as a "SET_BLOCK_COUNT" from the pre-defined multiblock read/write module 102 to the MMC host controller 214.

After sending the command to set the count of blocks for transfer, block 508 may check for errors received by the MMC host controller 214. When no errors are returned, block 510 may begin transfer of the set quantity of blocks using the pre-defined mode of transfer. As described above, the pre-defined mode of transfer does not require a stop transmission signal to indicate successful completion. Thus, the pre-defined mode of transfer is successful upon transfer of the set count of blocks, without waiting for a stop transmission signal which may be delayed.

Block 512 may then set the stop transmission flag such as STOP_TRANSMISSION to null. Setting this flag to null indicates to participants in the MMC stack 306 that the open-mode of transfer requested has completed successfully. Thus, while the transfer was actually accomplished using a pre-defined mode of transfer, an open-mode of transfer is emulated to minimize the impact on the MMC stack 306.

Returning to 508, when the MMC does respond with an error, block 514 may process the error. Errors may include an invalid value for the SET_BLOCK_COUNT, loss of communication with the multimedia card 216, and so forth.

Source code in the C language for one implementation of a pre-defined multiblock read/write module follows. This code is provided as an example, not as a limitation.

Example Code 1

```
/* The mmc_blk_issue_rq( ) has been modified. We only list
the most relevant code.
mmc_blk_issue_rq( ) issues the multiblock read/write.
It does the following:
        if (brq.data.blocks > 1) {
    brq.mrq.stop = &brq.stop;
            readcmd = MMC_READ_MULTIPLE_BLOCK;
            writecmd =
MMC_WRITE_MULTIPLE_BLOCK;
        } else {
            brq.mrq.stop = NULL;
            readcmd = MMC_READ_SINGLE_BLOCK;
            writecmd = MMC_WRITE_BLOCK;
        }
Where brq.stop looks like:
            brq.stop.opcode = MMC_STOP_TRANSMISSION;
            brq.stop.arg = 0;
            brq.stop.flags = MMC_RSP_SPI_R1B |
MMC_RSP_R1B | MMC_CMD_AC;
Then,
        if (rq_data_dir(req) == READ) {
            brq.cmd.opcode = readcmd;
            brq.data.flags | = MMC_DATA_READ;
        } else {
            brq.cmd.opcode = writecmd;
            brq.data.flags | = MMC_DATA_WRITE;
        }
And sends the command to the controller driver. This is
where we trap.
We do the following:
        if ( (brq.data.blocks > 1) &&
            (card->host->pre-defined == 1)) {
            struct mmc_command cmd1;
            cmd1.opcode = MMC_SET_BLOCK_COUNT;
            cmd1.arg = brq.data.blocks;
            cmd1.flags = MMC_RSP_R1 |
MMC_CMD_AC;
            mmc_wait_for_cmd(card->host, &cmd1,
5);
            brq.mrq.stop = NULL;
        }
/*
```

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A method comprising:
   receiving a request for an open-ended mode multiblock transfer to transfer two or more data blocks between a multimedia card and a multimedia card host controller;
   when a pre-defined mode of block transfer is supported by the multimedia card host controller:
   setting a count of blocks for transfer by the multimedia card host controller;
   transferring, after the setting the count, the set count of blocks to or from the multimedia card;
   setting, after the transferring the set count of blocks, a stop transmission flag to indicate that the transferring of the set count of blocks has stopped; and
   when the pre-defined mode of block transfer is unsupported by the multimedia card host controller:
   initiating an open-ended mode of transfer of the two or more data blocks.

2. The method of claim 1, wherein each of the two or more data blocks comprises bytes from a sector in the multimedia card.

3. The method of claim 1, wherein the setting of the number of blocks comprises issuing a SET_BLOCK_COUNT command to the multimedia card host controller.

4. The method of claim 1, wherein the setting of the stop transmission flag comprises setting a STOP_TRANSMISSION flag associated with an open-ended mode of transfer to indicate a transmission has stopped.

5. A method comprising:
   trapping a request for an open-ended mode of multiblock transfer between a multimedia card and a multimedia card host controller;
   setting, after the trapping the request, a count of blocks in the multiblock transfer by the multimedia card host controller at least partially in response to the trapping of the request; and
   transferring, after the setting the count of blocks, the set count of blocks between the multimedia card and the multimedia card host controller using a pre-defined mode of transfer.

6. The method of claim 5, wherein the transferring of the set count of blocks using the pre-defined mode of transfer comprises initiating the transfer of the set count of blocks using the pre-defined mode of transfer and completing the transfer upon reaching the set count of blocks without receiving a stop command.

7. The method of claim 5, wherein the setting of the count of blocks comprises issuing a SET_BLOCK_COUNT command to the multimedia card host controller.

8. The method of claim 7, wherein the SET_BLOCK_COUNT command comprises a CMD23 command.

9. The method of claim 5, further comprising setting a stop transmission flag to indicate that the transferring of the set count of blocks has stopped.

10. The method of claim 5, further comprising checking the multimedia card host controller for errors.

11. The method of claim 5, wherein the multimedia card comprises an embedded multimedia card.

12. A system comprising:
a central processor unit;
a memory coupled to the central processor unit;
a multimedia card controller coupled to the central processor unit;
a multimedia card coupled to the multimedia card controller;
a pre-defined multiblock read/write module stored in the memory and configured to execute on the central processor unit, the pre-defined multiblock read/write module being configured to:
trap a command for an open-ended multiblock read/write transfer between a multimedia card and a multimedia card host controller;
set, after the trap of the command, a pre-defined number of blocks for the open-ended multiblock read/write transfer; and
initiate, after the set of the pre-defined number of blocks, a transfer of the pre-defined number of blocks using a pre-defined mode of transfer.

13. The system of claim 12, wherein the pre-defined multiblock read/write module is further configured to set a stop transmission flag to null to indicate that the transferring of the pre-defined number of blocks has stopped.

14. The system of claim 13, wherein the stop transmission flag is associated with the command for the open-ended multiblock read/write transfer.

15. The system of claim 12, wherein the multimedia card comprises an embedded multimedia card.

16. One or more computer-readable storage media storing instructions that, when executed by one or more processors, cause the one or more processors to perform acts comprising:
trapping a request for an open-ended mode of multiblock transfer between a multimedia card and a multimedia card host controller;
setting, after the trapping the request, a count of blocks in the multiblock transfer by the multimedia card host controller; and
transferring, after the setting the count of blocks, the set count of blocks between the multimedia card and the multimedia card host controller using a pre-defined mode of transfer.

17. The one or more computer-readable media of claim 16, wherein the pre-defined mode of transfer comprises initiating the transfer of the set count of blocks using the pre-defined mode of transfer and completing the transfer upon reaching the set count of blocks without receiving a stop command.

18. The one or more computer-readable media of claim 16, wherein the setting of the count of blocks comprises issuing a SET_BLOCK_COUNT command to the multimedia card host controller.

19. The one or more computer-readable media of claim 18, wherein the SET_BLOCK_COUNT command comprises a CMD23 command.

20. The one or more computer-readable media of claim 16, further comprising checking the multimedia card host controller for errors.

* * * * *